United States Patent
Vinoly et al.

(10) Patent No.: US 7,189,909 B2
(45) Date of Patent: Mar. 13, 2007

(54) CAMERA ASSEMBLY FOR FINGER BOARD INSTRUMENTS

(75) Inventors: Roman Vinoly, New York, NY (US); Patrick Alexander Deegan, Florence, MA (US); Samuel Thomas Campbell Hyers, New York, NY (US)

(73) Assignee: Román Viñoly, New York, NY (US)

( * ) Notice: Subject to any disclaimer, the term of this patent is extended or adjusted under 35 U.S.C. 154(b) by 89 days.

(21) Appl. No.: 10/995,650

(22) Filed: Nov. 23, 2004

(65) Prior Publication Data

US 2006/0107816 A1     May 25, 2006

(51) Int. Cl.
*G10C 9/00* (2006.01)
*H04N 5/30* (2006.01)

(52) U.S. Cl. .................. 84/453; 84/453; 84/477 R; 84/478; 348/143

(58) Field of Classification Search ............... 84/477 R
See application file for complete search history.

(56) References Cited

U.S. PATENT DOCUMENTS

| | | | |
|---|---|---|---|
| 4,027,329 A | 5/1977 | Coutta | |
| 4,227,077 A | 10/1980 | Hopson et al. | |
| 4,510,526 A | 4/1985 | Coutta et al. | |
| 4,982,618 A | 1/1991 | Culver | |
| 5,018,009 A | 5/1991 | Koerv | |
| 5,023,434 A | 6/1991 | Lanfer et al. | |
| 5,225,863 A | 7/1993 | Weir-Jones | |
| 5,241,380 A * | 8/1993 | Benson et al. | 348/143 |
| 5,327,233 A | 7/1994 | Choi | |
| 5,526,041 A * | 6/1996 | Glatt | 348/143 |
| 5,742,136 A | 4/1998 | Ono et al. | |
| 5,767,842 A * | 6/1998 | Korth | 345/168 |
| 6,084,167 A * | 7/2000 | Akimoto et al. | 84/477 R |
| 6,084,168 A * | 7/2000 | Sitrick | 84/477 R |
| 6,087,577 A * | 7/2000 | Yahata et al. | 84/478 |
| 6,191,507 B1 * | 2/2001 | Peltier et al. | 310/12 |
| 6,245,982 B1 * | 6/2001 | Suzuki et al. | 84/477 R |
| 6,246,050 B1 | 6/2001 | Tullis et al. | |
| 6,329,582 B1 * | 12/2001 | Catalano, Jr. | 84/385 R |
| 6,388,181 B2 * | 5/2002 | Moe | 84/477 R |
| 6,462,775 B1 * | 10/2002 | Loyd et al. | 348/151 |
| 6,614,468 B1 | 9/2003 | Nordmann | |
| 6,650,318 B1 * | 11/2003 | Arnon | 345/168 |
| 6,683,977 B1 | 1/2004 | Albrecht et al. | |
| 6,903,772 B1 * | 6/2005 | Shinohara | 348/311 |
| 6,982,375 B2 * | 1/2006 | McGregor | 84/478 |
| 2001/0029829 A1 * | 10/2001 | Moe | 84/478 |

(Continued)

*Primary Examiner*—Lincoln Donovan
*Assistant Examiner*—Robert W. Horn
(74) *Attorney, Agent, or Firm*—Notaro & Michalos P.C.

(57) ABSTRACT

A camera assembly for filming the hands of a musician playing a finger board instrument includes a guiding device mounted to the finger board instrument. A stage movably engages the guiding device. A camera is mounted on the stage for filming the hands of the fingerboard user as the hands travel along the finger board. A driving device, such as a linear motor, is connected to the stage for moving the stage along the guiding device. A means for controlling the camera is also provided, either manually from a remote location or by visual tracking. A sensor senses the velocity and position of the stage and outputs a detection signal to the control means. The control means transmits command signals to the driving device for actuating movement of the camera along the guiding device.

27 Claims, 10 Drawing Sheets

U.S. PATENT DOCUMENTS

| | | | |
|---|---|---|---|
| 2002/0005111 A1* | 1/2002 | Ludwig .................. 84/645 |
| 2002/0046638 A1* | 4/2002 | Wright et al. ............ 84/477 R |
| 2002/0051057 A1* | 5/2002 | Yata ..................... 348/142 |
| 2002/0154218 A1* | 10/2002 | Loyd et al. ............. 348/151 |
| 2002/0167537 A1* | 11/2002 | Trajkovic ............... 345/649 |
| 2002/0168091 A1* | 11/2002 | Trajkovic ............... 382/107 |
| 2003/0024375 A1* | 2/2003 | Sitrick .................. 84/477 R |
| 2004/0159212 A1* | 8/2004 | Terada .................. 84/477 R |
| 2004/0237757 A1* | 12/2004 | Alling ................... 84/601 |
| 2005/0056141 A1* | 3/2005 | Uehara .................. 84/645 |
| 2005/0150362 A1* | 7/2005 | Uehara .................. 84/645 |
| 2005/0275720 A1* | 12/2005 | Noguchi ................ 348/152 |
| 2006/0107816 A1* | 5/2006 | Vinoly et al. ........... 84/47 |
| 2006/0156361 A1* | 7/2006 | Wang et al. ............ 725/105 |

* cited by examiner

CAMERA ASSEMBLY FOR FINGER BOARD INSTRUMENTS

FIELD AND BACKGROUND OF THE INVENTION

The present invention relates to cameras and in particular to a camera assembly movably mounted to a musical instrument having a finger board (i.e., piano keys) for providing video, pictures or images of a front or "head-on" view of a musician's hands playing the finger board at a remote location.

A need exists for providing full, close-up, unobstructed views of a musician's hands playing a finger board instrument. Filming or videotaping of pianist's concerts have been done for years to allow audiences to view the concerts on a screen located outside of the concert venue and/or at a later time or date. However, due to the limited angles and views for filming the pianist's hands, audiences are not provided with a full unobstructed view of the piano play. A top or overhead view has been in common use, but such a view is restricted to showing a lateral movement parallel to the plane of the finger board and fails to show the vertical articulation of the musician's fingers on the piano keys. Audiences are deprived of the visual pleasure and enjoyment of the quick, complicated and yet very graceful hand movement along the piano keys. Pianists are typically filmed from the side of the piano or from the top looking down on the piano. The hand farther from the camera is often obstructed by the closer hand or the pianist's arm.

Instructional visual recordings for piano playing are similarly limited because of the inability of the prior art to provide full views of the pianist's hands without any obstructions and/or at a closer view point.

Prior art discloses movable cameras as part of surveillance systems. U.S. Pat. No. 5,225,863 to Weir-Jones discloses a remotely operated camera system comprising a camera suspended below the underside of a mounting unit supported by a suspension cable and support pulleys. A traction cable extends along the travel path of the mounting unit. An optical encoder is driven by the rotation of a support pulley to sense the distance of travel of the camera mounting unit.

U.S. Pat. No. 4,027,329 to Coutta discloses a surveillance system in which one or more cameras are moveable along a rail assembly suspended from a ceiling.

U.S. Pat. No. 5,241,380 to Benson, et al discloses a surveillance system comprising a track positioned along a selected path, a moveable carriage supported by the track, a pair of electrical conductors mounted adjacent and parallel to the track to provide power to a drive assembly mounted on the carriage, and video cameras mounted to the carriage for monitoring regions adjacent the selected path. Control signals for controlling placement of the carriage along the track are transmitted on the conductors to the carriage.

U.S. Pat. No. 6,614,468 to Nordmann discloses a monitoring installation in which a monitoring unit with a camera is suspended from a trolley that rolls or glides by one traction rope or cable which pulls the trolley. The traction rope or cable is disposed within a hollow beam. The position of the trolley along the beam is monitored by an optical device mounted on the trolley which reads markings on the beam. Electrical conductors extending along a path parallel to the traction rope transmit the signals generated by the reading of the markings.

U.S. Pat. No. 6,191,507 to Peltier, et al discloses a modular conveyor system comprising a plurality of track sections with coils forming a continuous track, a moving element containing thrust producing magnets, a linear encoder strip, and load-bearing wheels constrained to ride or travel along the track and, and multiple linear encoder readers spaced at fixed positions along the track.

However, none of these patents disclose, teach or suggest a camera assembly used in connection with finger board instruments.

SUMMARY OF THE INVENTION

It is an object of the present invention to provide a camera assembly mounted to a fingerboard instrument for filming a musician's hands playing the finger board, i.e., piano keys, without any obstructions.

Another object of the present invention is to provide a robotically controlled camera which is movably mounted inside a cavity of a finger board instrument behind the finger board for filming a musician's hands.

Still another object of the present invention is to provide a movably mounted camera assembly for a finger board instrument which provides separate degrees of freedom to control the camera's pan, tilt and linear movement along the length of the finger board.

Further still, another object of the present invention is to provide a camera assembly for a finger board instrument which is invisible to an audience, silent and free of any appreciable vibration and effect on the acoustics of the finger board instrument.

In accordance with the present invention, a camera assembly is mounted inside a cavity of an instrument having a finger board. The camera assembly includes a guiding device, such as tracks, a cable system or cylindrical shafts. The guiding device is affixed to the finger board instrument behind the finger board. A stage movably engages the guiding device. A camera is mounted on the stage for filming the musician's hands as they play the finger board.

A driving device, such as a linear motor, is connected to the stage for moving the stage along the guiding device. A control means interfaces an operator with the camera. The control means transmits command signals to the driving device for controlling the movement, location and velocity of the stage. A sensing means senses the velocity and position of the stage along the guiding device and transmits an output signal to the control means. Based on the output signal, the control means re-transmits command signals to the driving device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
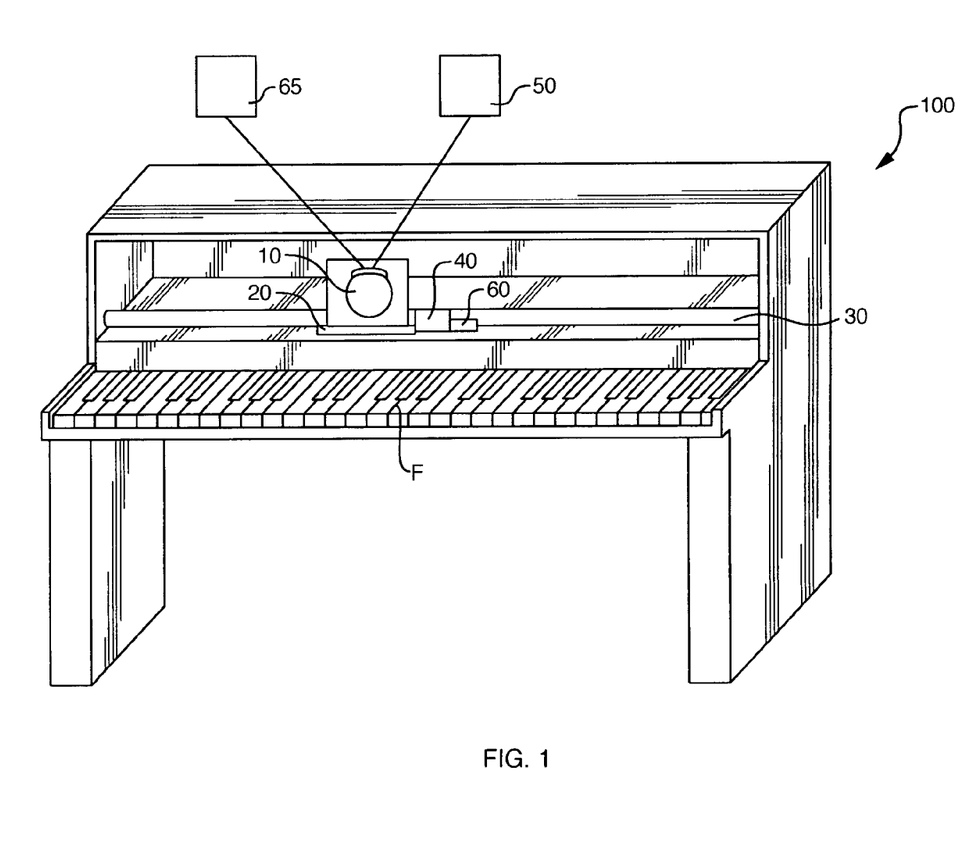
FIG. 1 is a schematic representation of the present invention.

Referring now to the drawings, in which like reference numerals are used to refer to the same or similar elements, as shown in FIG. 1, a device 100 linearly moves camera 10 inside an instrument having a finger board F, such as a piano or electric keyboard. Camera 10 is movably mounted inside a cavity adjacent the finger board F. A control means 50 (shown schematically) controls the movement and velocity of camera 10 from a remote location to follow the musician's fingers as they play the finger board F. Camera 10 films the musician's fingers and transmits output video signals via a communication line to a screen apparatus 65 (shown schematically). The device 100 uses well-known technology to convert the output video signals to images of the musician's fingers playing the finger board F displayed on the screen apparatus 65. Although the preferred embodiments will be described below in the context of a piano, the subject invention can be used with other finger board instruments, such as organs and electric keyboards.

Device 100 includes guiding device 30 mounted inside a piano; stage 20 movably engaged to guiding device 30; camera 10 mounted on stage 20; driving device 40 connected to stage 20 for driving stage 20 on guiding device 30; means for controlling 50 movement and velocity of stage 20 from a remote location via a communication link to driving device 40; and sensing device 60 for sensing the position and velocity of stage 20 on guiding device 30.

Guiding device 30 with stage 20 and camera 10 can also be affixed on an outer surface of piano behind the fingerboard if the piano body does not have a cavity with sufficient space to house components of the present invention.

Camera 10 preferably comprises a high definition, high megapixel digital compact camera which provides pictures and/or video with very high quality resolution. Camera 10 is also preferably light-weight and small to minimize any vibration during movement along guiding device 30.

Guiding device 30 preferably comprises a track which provides a linear path parallel the finger board for stage 20 and camera 10. Guiding device 30 is affixed to inner walls 201 of piano via common fasteners, such as bolts, screws or brackets (not shown). Guiding device 30 can also be pressure fitted inside piano.

Guiding device 30 preferably has a smooth, precision guiding surface which movably engages stage 20. Guiding device 30 can have numerous types of configurations, including twin shaft guides, low profile guides, roller rails, linear motion guides, M/V style rails, round shafts, spline shafts, track system, T-shaped guides, and V-grooved guides, to name a few. The present invention is not limited to any particular type of guide or track.

Twin shaft guides comprise two shafts that are located in close proximity to each other. Twin shafts can be parallel along a horizontal plane, parallel along a vertical plane or staggered so that they are separated by an angle between zero and ninety degrees.

V-grooved guides are shafts with grooves that are machined along the length of the guide at a 90-degree or other angle, forming a "V" shape and acting as a race for bearings or rollers (which are connected to stage) to run on.

Linear motion guides include linear guide bearings, square rail linear bearings, linear guide ways and recirculating ball bearings.

A M/V style rail is a linear rail or guide with two mating rails.

Round shaft linear guides are hardened ground shafts used with bushing type linear bearings.

A spline shaft has grooves or tongues machined along its length.

A track system is a linear guide assembly that combines several rail components into a closed loop system.

T-shaped guide is a rectangular guide where the bearing races are extended outward from the top of a support to form a "T" shape.

Guiding device 30 may also comprise of a belt or cable pulley system to which stage 20 is attached. Belt or cable pulley systems for moving stages in a predetermined path are well-known. See U.S. Pat. No. 4,027,329 to Coutta.

Figure 2:
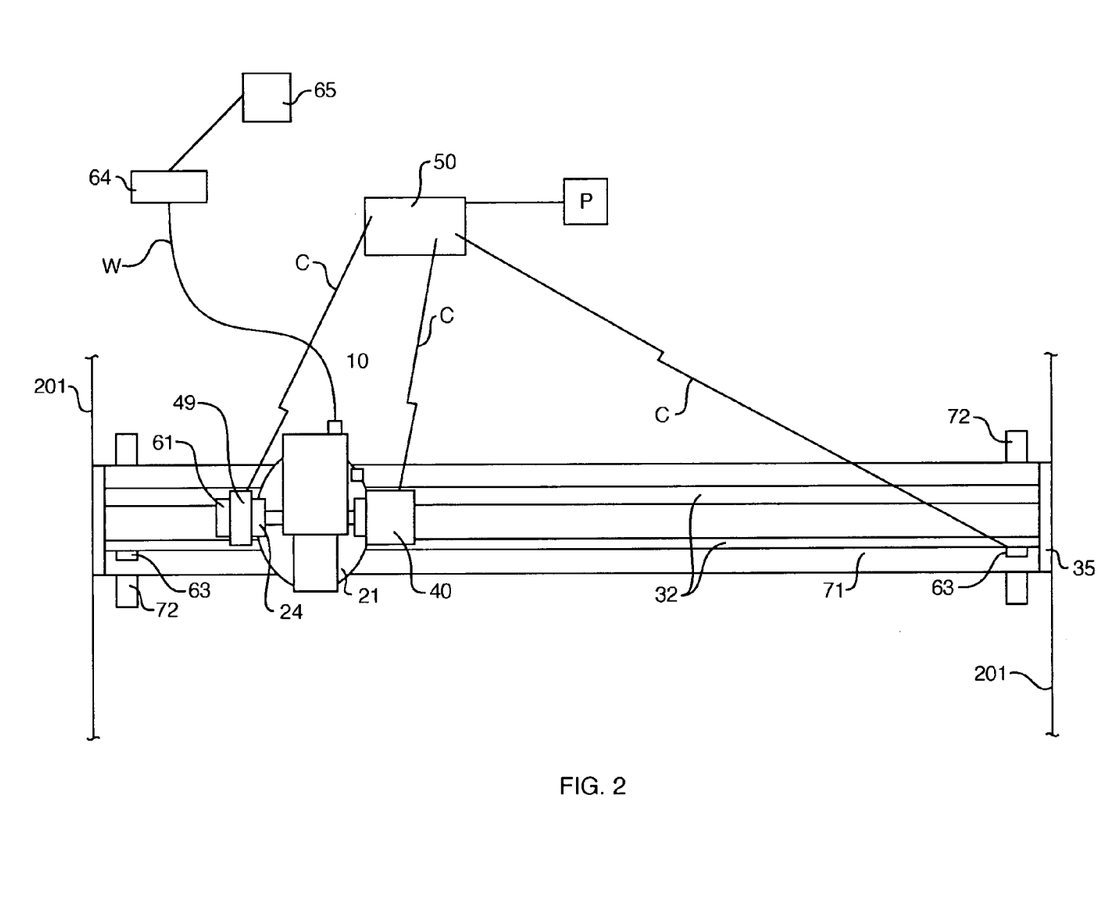
FIG. 2 is a top plan view of a first embodiment of the present invention.
Figure 3:
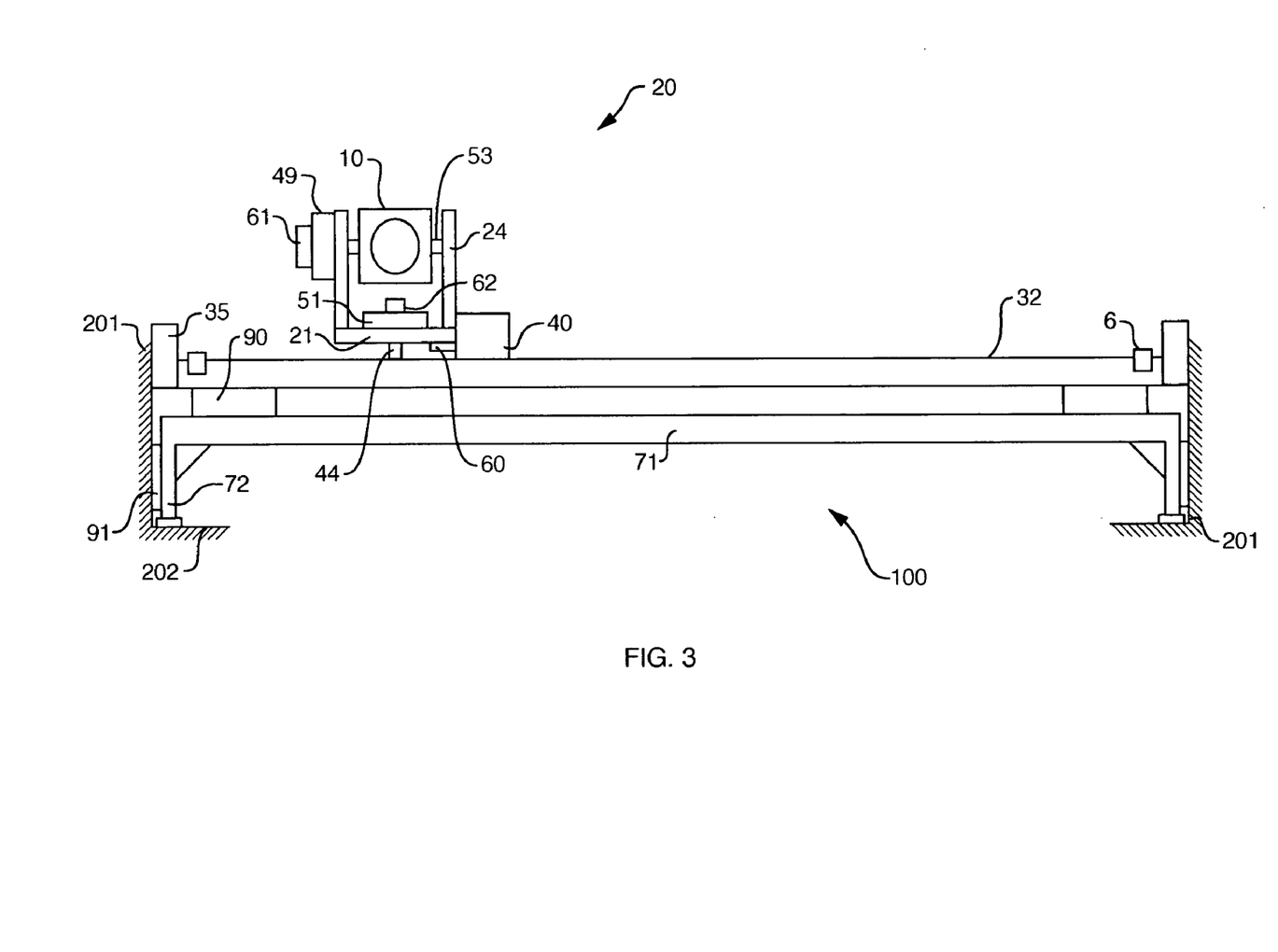
FIG. 3 is a side view of a first embodiment of the present invention.

Referring to FIGS. 2 and 3, guiding device 30 comprises two guide rails 32. Guide rails 32 can be arranged relative to each other in several positions, such as parallel in a vertical plane, parallel in a horizontal plane, or staggered. Guide rails 32 are preferably mounted to support frame 70.

Support frame 70 comprises platform 71 and legs 72 that extend downward from opposite ends of platform 71 to inner piano walls 201. Support frame 70 can comprise other shapes and configurations, such as a rectangular box for housing the guide rails 32, stage 20 and camera 10, to adapt to the size and shape of the piano cavity.

Support frame 70 is preferably pressure fitted between piano inner walls 201. Support frame 70 can also be affixed to piano inner walls 201 via conventional fasteners, such as bolts, screws, etc. (not shown). A bracket (not shown) can also connect support frame 70 to piano inner wall 201.

A bracket is affixed to piano inner wall 201 adjacent each leg 72. The bracket has a groove or slot for receiving a mating protrusion of support frame 70. The bracket allows support device 70, along with guiding device 30, stage 20 and camera 10, to be released and removed from piano cavity, as a unitary structure. The bracket also includes an expansion mechanism which presses against support frame 70 to hold support frame 70 firmly in place.

Support frame 70 is formed of a rigid material to withstand any vibration caused by movement of stage 20 on guiding device 30.

Bumper 35 is preferably affixed to end of each guide rail 32 to prevent stage from contacting piano inner walls 201.

Stage 20 movably engages guide rails 32. Stage 20 linearly displaces camera 10 along length of guiding device 30 to follow the pianist's moving hands along finger board. Stage 20 includes mechanisms for movably engaging guiding device 30, such as bearings, bushings or rotatably mounted rollers or wheels which ride on mating tracks or rails.

Figure 4:
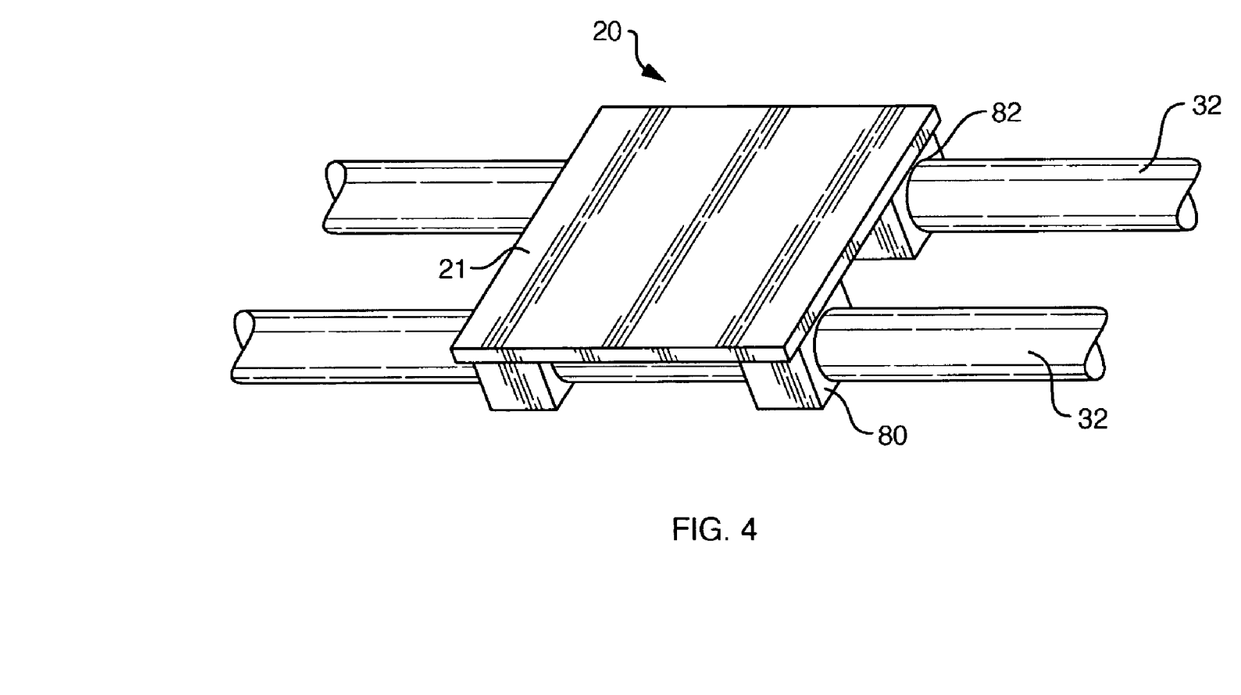
FIG. 4 is a side perspective view of stage, bearings and guiding rails of the present invention.

The device 100 preferably uses bearings 80, as shown in FIG. 4, to operate between stage 20 and guiding device 30. Bearings 80 are connected to stage 20 and movably engage with guiding device 30 to allow stage 20 to linearly slide along guiding device 30. Bearings 80 have openings 82 which receive guide rails 32.

Bearings 80 are preferably the frictionless type, such as air bearings, to minimize noise and vibration. Air bearings 80 do not have solid to solid contact with guide rails 32. Rather, gap (not show) exists between the inner wall of bearings 80 and outer surface of guide rails 32 to accommodate application of compressed air.

An air tank (not shown), off-board to the piano, supplies compressed air to the air bearings 80. Air bearings 80 release the compressed air as they slide along guide rails 32. A thin film of compressed air forms between the inner wall of bearings 80 and guide rails 32 to support stage 20, similar to how a puck floats on an air hockey table.

Device 100 can incorporate other types of bearings 80 which are used to displace a stage along guide device 30, including flat ball cage, ball spline, ball bushing, needle roller cage, crossed roller, guide wheel, hydrostatic, plain or journal, linear motion guide, flat roller cage, and linear roller.

Bearings 80 can be formed of many materials, including, bronze, ceramic, graphite, plastic, and stainless steel. Bearings 80 can include a self-lubricating mechanism and/or a lubrication port, as is well-known in the art. Bearings 80 are not limited to a pillow block structure but may also comprise a circular, flanged or rectangular structure.

Driving device 40, as schematically shown in FIGS. 2 and 3, drives stage 20 along guiding device 30. Driving device 40 can comprise a motor, preferably a linear servomotor which applies direct force to stage to. Linear servomotors have no moving parts that make contact. Thus, linear servomotors provide minimal frictional resistance, noise and vibration during movement of stage 20. Linear servomotors also provide high position accuracy, high acceleration and long travel distance.

As shown in FIG. 3, stage 20 has platform 21 for mounting camera 10. Stage 20 preferably includes side walls 24 which extend upward from platform 21 to form a U-shaped housing. Stage 20 preferably provides camera 10 with three degrees of movement. Camera 10 is pivotally mounted between side walls 24 to allow pivoting around a horizontal axis.

A secondary drive mechanism, such as a rotary servomotor 49 (shown schematically), and tilt pivot 53 rotate camera 10 around the horizontal axis. Tilt pivot 53 is supported by rotary bearing (not shown).

Camera 10 is also pivotally mounted on platform 21 to allow rotation around a vertical axis, which is preferably perpendicular to the guiding device 30. A tertiary drive mechanism, such as a rotary servomotor 51 (shown schematically), and pan pivot 44 rotate camera 10 around the vertical axis. Pan pivot 44 is supported by rotary bearings (not shown).

In another embodiment, motor drives rotary bearings and a gear head to rotate entire stage platform 21 or portion thereof, along with camera 10, around the vertical axis.

Operator interfaces with camera 10 and stage 20 through control means 50 (schematically shown in FIG. 2) located at a remote location. Control means 50 controls the speed, position and movement of camera 10 and stage 20. A software control system (not shown) operates control means 50.

Device 100 preferably includes sensor technology to measure the velocity and positions of camera 10 along guiding device 30.

Sensors are mounted on stage 20. Sensors measure the linear, tilt and pan positions of camera 10, as well as, the linear velocity, tilting velocity and panning velocity of camera 10.

FIG. 3 shows sensor 60 (represented schematically) which measures the linear position and velocity of camera 10. Sensor 60 is mounted on linear servomotor 40.

Sensor 61 (shown schematically) for measuring tilt position and tilt velocity of camera 10 is mounted on rotary servomotor 49.

Sensor 62 (shown schematically) for measuring pan position and pan velocity of camera 10 is mounted on rotary servomotor 51.

Sensor 60 is preferably a linear encoder. Sensors 61, 62 are preferably rotary encoders. Sensors incorporated into device 100 can also consist of the capacitive, inductive, opto-electronic, magneto-resistive, infra-red break beam, radar or cable extension type, for determining the placement, speed and/or movement of camera 10.

Device 100 preferably also includes proximity sensors 63 (shown schematically in FIGS. 2 and 3) which prevent stage 20 from colliding with piano inner walls 201. Proximity sensors 63 are mounted on the respective ends of guiding device 30 and transmit warning signals to control means 50 via a communication line when stage 20 is near piano inner wall 201.

Proximity sensors 63 can comprise a Hall sensor which detects the presence of magnetic flux during the passage of a magnet (not shown) on stage 20 or an infra-red break-beam type sensor.

Sensors 60, 61, 62, 63 communicate with control means 50 via a connection line (referenced schematically as C in FIG. 2), i.e., electrical wire or cable or through wireless link, i.e., transmitter and receivers, as is known in the art. Sensors 60, 61, 62, 63 create a unique position signal that is available anywhere along travel of camera 10 on guiding device 30. Sensors 60, 61, 62, 63 sense and collect the position and velocity data, including the exact state of the degrees of freedom of camera 10, and transmit the data signals, via connection line C to control means 50.

Control means 50 receives and processes said signals. Control means 50 transmits command signals to motors 40, 49, 51 which generate torques for actuating the commanded movement, position and/or velocity of camera 10.

Control means 50 preferably includes processor (not shown) which allows the position and the velocity data of stage 20 transmitted by sensors to be displayed on an electronic display (not shown). Control means 50 generates and transmits control signals for controlling movement, placement and velocity of stage 20 along the guiding device 30 to sensors 60, 61, 62 via connection line C.

Control means is preferably a paddle with a spring loaded return. Control means 50 can also comprise a touch pad which simulates piano keys, keyboard joystick, a mixing board slider, or a master/slave operator control system.

An encoder (not shown) is preferably used with sensors to allow control means 50 to override any operator input and to impose software limits on the velocity and location of stage 20 on guiding device 30.

As shown in FIG. 2, camera 10 records images and transmits video output signals to video demodulator board 64 (shown schematically), via wires (shown schematically as W).

Video demodulator board 64 transmits signals to screen 65 (shown schematically) which displays images.

Power source (shown schematically as P) supplies power to device 100. Power source is preferably located at a remote location.

Referring to FIG. 3, device 100 preferably includes a dampening device 90 for dampening any vibration caused by movement of stage 20 on guiding device 30. Dampening device 90 is preferably an elastomer member that is frictionally fitted between support frame 70 and guiding device 32.

Separators 91, also preferably consisting of an elastomer sheet, are fixed between support legs 72 of support frame 70 and piano inner walls 201. Separators 91 provide a constricted fit so that device 100 cannot move or become displaced inside the piano cavities.

Figure 5:
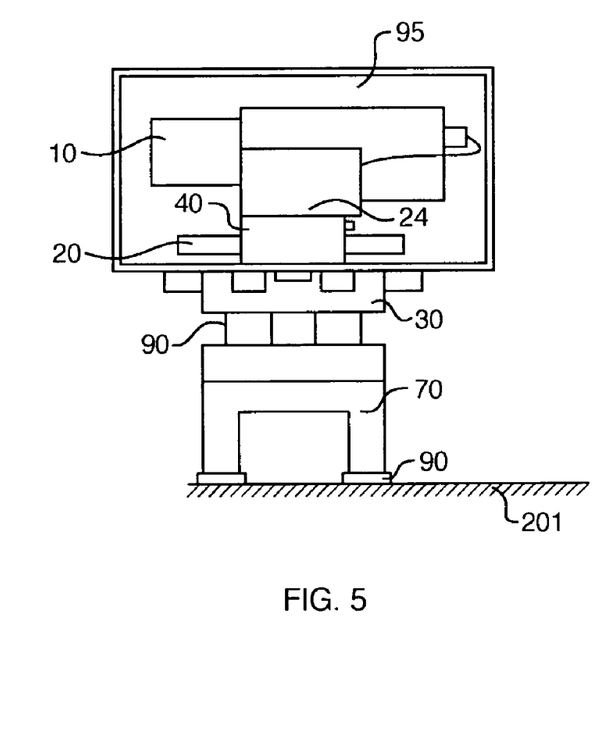
FIG. 5 is a side view of dampening enclosure of the present invention.

Dampening device 90 for sound dampening consists of enclosure 95 which surrounds camera 10, as shown in FIG. 5. Enclosure is preferably formed of sound dampening material such as glass or plexiglass. Enclosure 95 is preferably mounted to support frame 70.

Figure 6:
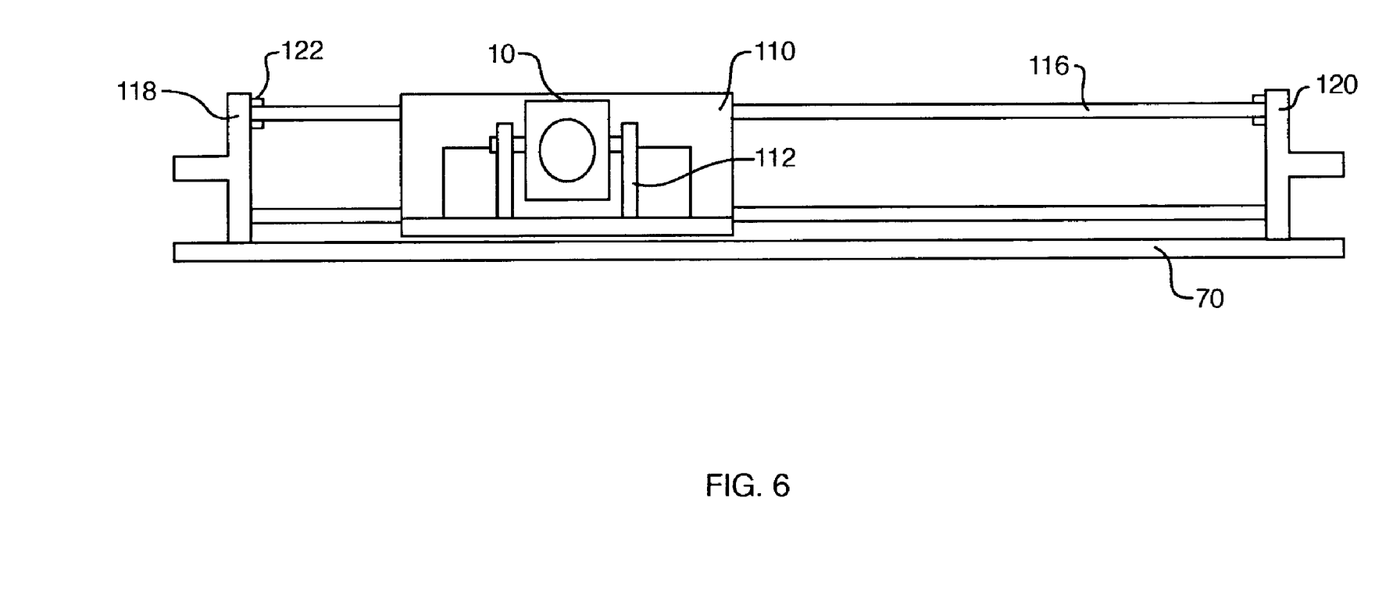
FIG. 6 is front view of a second embodiment of the present invention.
Figure 7:
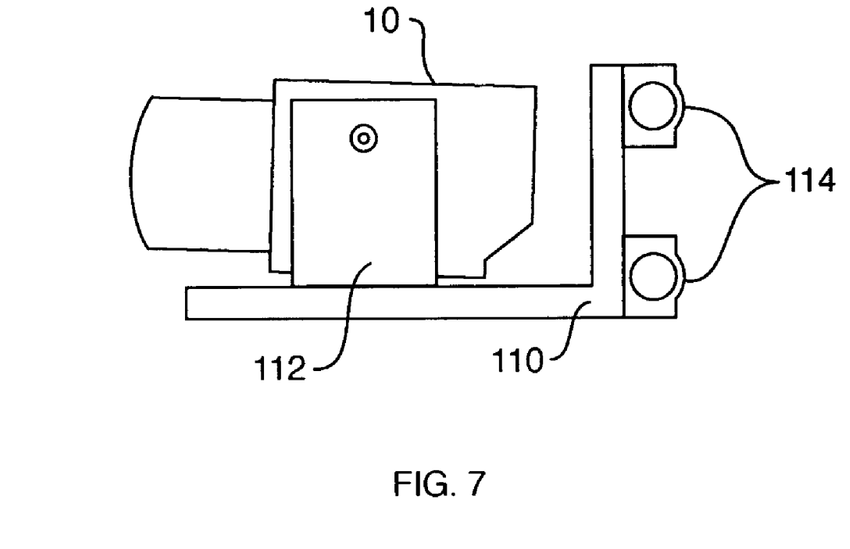
FIG. 7 is a side view of a second embodiment of the present invention.

In a second embodiment of the present invention, as shown in FIGS. 6–7, camera 10 is pivotally mounted on an L-shaped platform 110 via supports 112. Pillow blocks 114 are attached to one end of the L-shaped platform 110 for receiving guiding device 30.

As shown in FIG. 6, the platform 110 is movably engaged to a guiding device in the form of shafts 116 which are supported by support ends 118 and 120. Sensors 122 are also provided on opposite ends of one of the shafts.

Figure 8:
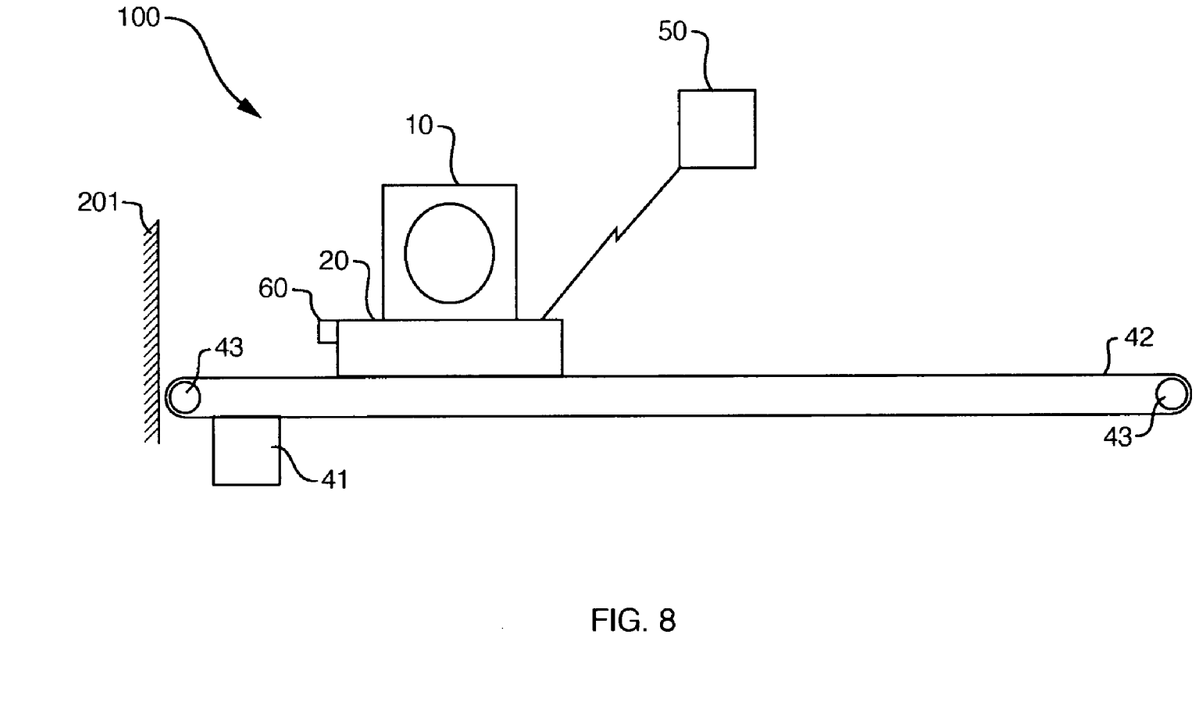
FIG. 8 is a schematic representation of a third embodiment of the present invention.

In a third embodiment, as shown in FIG. 8, driving device 40 comprises a belt assembly powered by a motor 41 (schematically shown) for conveying stage 20 with mounted camera 10. Stage 20 is attached to belt 42 and moves camera 10 in a linear path approximately parallel the finger board (not shown). Motor 41 enables pulleys 43 to be driven in rotation so that belt forms a loop tensed between the two pulleys 43.

The traction force on belt 42 is controlled by means of a friction element (not shown) between the motor and the driving pulley and/or by controlling the motor's driving torque.

Figure 9:
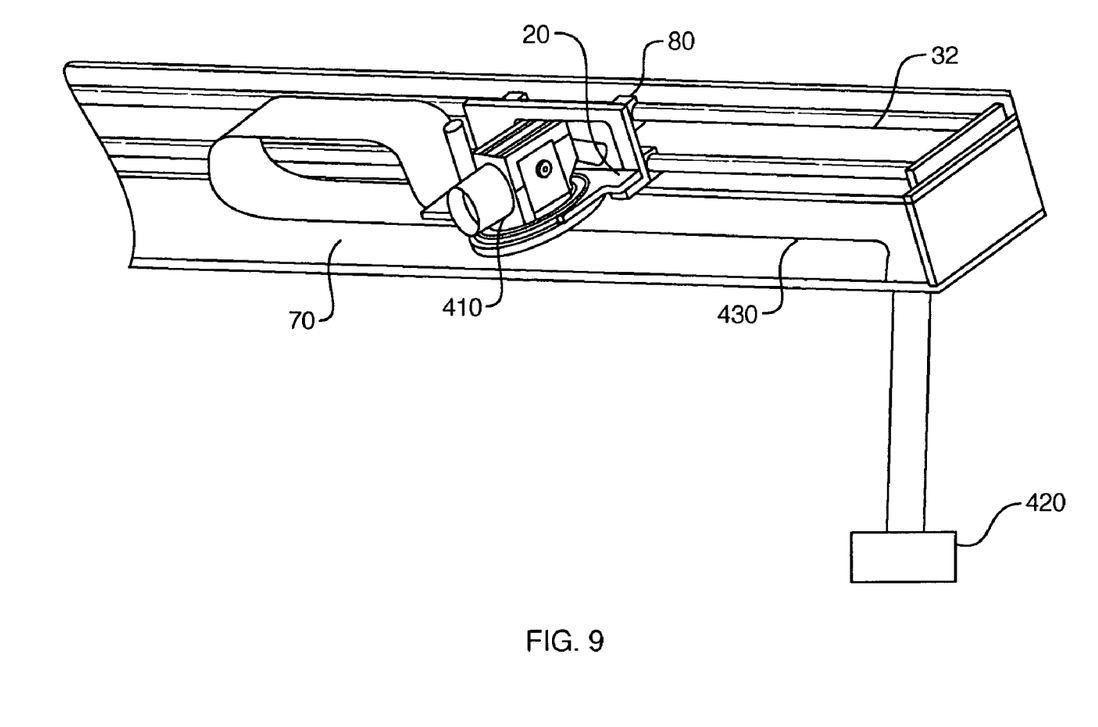
FIG. 9 is a top perspective view of a fourth embodiment of the present invention.

FIG. 9 shows a fourth embodiment of the present invention having an optical assembly 410, and a remotely located camera control unit 420 (shown schematically). The optical assembly 410 comprises a charged coupled device (CCD) and a lens assembly. The CCD receives images from lens assembly and converts images to electric pulses which are then transmitted to camera control unit 420.

Optical assembly 410 and camera control unit 420 are electrically connected by a cable 430 which transmits data and power to optical assembly. Cable 430 is preferably a flexible cable or flexible flat cable, such as a flexible printed circuit (FPC), which has thin conductive traces that are attached to a non-conductive flexible structural substrate. This configuration is very common in inkjet printers and large scale plotters.

Figure 10:
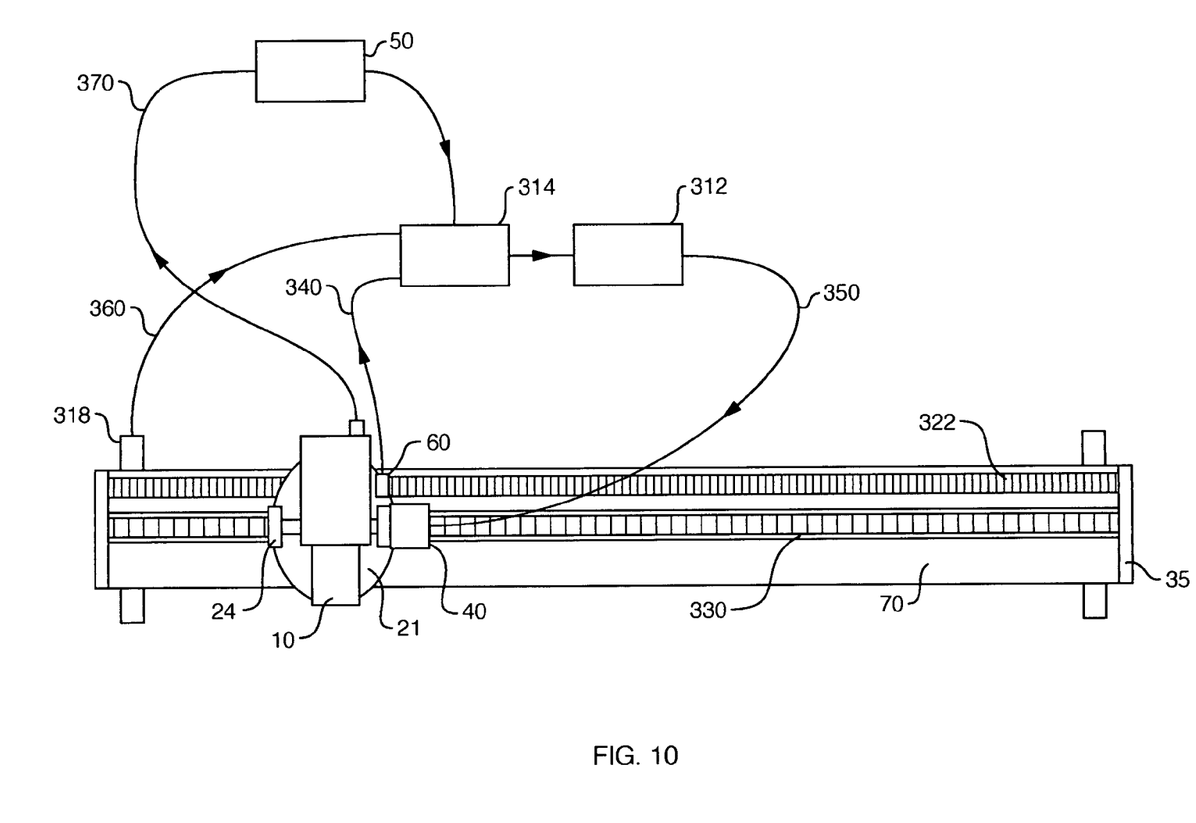
FIG. 10 is top plan view of a fifth embodiment of the present invention.

In a fifth embodiment of the present invention, as shown in FIG. 10, a servo-loop is used to ensure that stage 20 does not travel beyond the ends, or physical limits, of the guiding device 30.

A device 100 includes servo amplifier (schematically shown) which interfaces with control means. Servo amplifier 312 prevents stage 20 from contacting the outer limits of guiding device 30. Servo amplifier includes a digital signal processor (not shown) that is capable of being programmed to prevent stage 20 from contacting the outer limits of guiding device 30. The digital signal processor monitors and controls the servomotors 40, 49 and 51. Control means 50 generates and transmits control signals to servo amplifier.

Servo amplifier translates and amplifies signal and transmits amplified signal to servomotors 40, 49, 51. The servomotors actuate movement of camera based on said signals. Guiding device 30 comprises a magnetic strip 330 connected to support device 70. The servo-loop includes a driving device 40, preferably a linear motor, a servomotor amplifier 312, a motion controller 314, a sensor 60, preferably a linear optical encoder, and limit and home detecting sensors 318.

Linear motor 40 is connected to stage 20. Linear motor 40 includes electronic thruster (not shown) consisting of a coil of conductive material that is activated by the servomotor amplifier 312.

The electronic thruster functions as an electro-magnet. The servomotor amplifier 312 provides high currents which flow through the electronic thruster. The electronic thruster is attracted to and repelled from, in an alternating pattern, magnetic strip 330.

Linear optical encoder 60 operates by counting ridges etched on track 322 made of metal or glass-like material bonded to the support.

Servomotor amplifier 312 and motion controller 314 are located a short distance from linear motor 40 and the linear optical encoder 60, preferably concealed within a sub-floor where the finger board instrument rests.

Motion controller 314 can be integrated into the same package as the servo motor amplifier 312. When motion controller 314 is separate, linear optical encoder 60 is connected to motion controller 314. Motion controller 314 is connected to remote operator control 50.

Based on the signal transmitted by linear optical encoder 60 and command signals transmitted from control means 50, motion controller 314 adjusts the signal it transmits to servomotor amplifier 312. The servomotor amplifier 312 directly translates the command signal into a high voltage and/or high current signal which is transmitted to linear motor 40 for moving stage 20 along magnetic strip 330.

The servo-loop is formed by the information flow circulating in the following circuit. Position information from linear optical encoder 60 travels to motion controller 314 via a linear encoder cable 340. Motion controller 314 generates a command signal which is received, translated and amplified by servomotor amplifier 312. Output from servomotor amplifier 312 is transmitted to linear motor 40 via linear motor cable 350, which in turn, actuates movement of stage 20. The movement of stage 20 is then sensed by linear optical encoder 60, and thus the circuit is complete.

Sensors 60 are attached to stage 20 or the support 70 and connected to motion controller 314 via cable 360.

Camera 10 is connected to the operator control 50 via a camera cable 370.

In another embodiment, the invention includes an intelligent visual tracking which incorporates motion tracking technology, as is known in the prior art, that allows the stage 20 to follow the movement of the pianist's hands without any manual control of the stage 20 at a remote location. Visual tracking uses algorithms, such as motion detector algorithms, for detecting and controlling movement of stage 20.

Motion detection and tracking encompasses software algorithms which use signals from both the camera and the position and velocity sensors to control the degrees of freedom of camera 10 in an automatic and autonomous manner. Vision based motion detection and tracking can specifically refer to algorithms that can consistently attend to certain features in a video signal on a frame by frame basis and report the positions and velocities of those features in a frame based coordinate system.

Tracking algorithms are not limited to motion detection based techniques. Tracking algorithms can also use image matching, background extraction, and other machine vision techniques use the position of the camera and frame by frame images to pinpoint the position of the attended objects, such as the musician's fingers. The tracking algorithms use the position and orientations with respect to the coordinate system (kinematics) of the camera 10 to pinpoint the position of the musician's fingers (or the objects that the algorithms have been parameterized to attend to). Given the kinematics of the degrees of freedom and their locations (grounded in a world based coordinate system), such motion detection algorithms can generate signals that represent the position and velocity of the objects that are associated with the attended features in the real world. Those positions and velocities can then be used to autonomously actuate the degrees of freedom of camera 10 to generate high level motions such as fly by object, follow object from dead-on perspective, retreat from object while object remains centered in camera frame, etc., without additional operator intervention.

Therefore, these algorithms could replace the human operator but still allow the human operator to intervene by transferring control of device 100 back to control means 50 (joystick, paddles, etc.) when commanded.

The present invention may incorporate Master/Slave operator control system in which one device or process, the "Master", controls one or more other devices or processes, "Slaves". Once the master/slave relationship is established, the direction of control is always from the master to the slave(s). The Master/Slave operator control mechanism requires two copies of the device 100. One copy resides inside the instrument (designated as the slave) and the other copy is presented in front of the operator (designated as the master).

The operator physically operates the master device by manually positioning the three degrees of freedom, the camera pan, the camera tilt, and the camera platform linear slide. Since the operator is responsible for manually positioning the master device, all active hardware is removed. This includes the camera, all motors, and their respective amplifiers, cables, and limit sensors. The position and velocity sensing encoders as well as the (homing sensors) remain to record the absolute positions and velocities of the camera platform.

Since the master is a functional copy of the slave, the slave receives its control input directly from the output of the master's sensors. Yet, the master need not be an exact copy of the slave since any physical deviation in scale can be corrected in the presentation of control input to the slave. The result of this configuration is that any movement of the master is recorded and exactly replicated or mimicked by the slave.

While a specific embodiment of the invention has been shown and described in detail to illustrate the application of the principles of the invention, it will be understood that the invention may be embodied otherwise without departing from such principles.

What is claimed is:

1. A camera assembly for filming hands playing a piano, the camera assembly comprising:
    a guiding device mounted to the piano;
    a stage movably engaged to the guiding device;
    a camera mounted to the stage;
    a driving device connected to the stage for moving the stage along the guiding device;
    a means for controlling the camera to follow the hands; and
    a support frame affixed inside the piano, the guiding device being mounted to the support frame.
2. The camera assembly as claimed in claim 1, wherein the guiding device is mounted inside a cavity of the piano.

3. The camera assembly as claimed in claim 1, further comprising means for measuring velocity and position of the stage and transmitting data signals to the means for controlling.

4. The camera assembly as claimed in claim 1, further comprising a servo amplifier which receives command signals from said means for controlling, said servo amplifier translating and transmitting said control signals to a linear servomotor attached to said stage, said linear servomotor moving said stage based on said control signals.

5. The camera assembly as claimed in claim 1, further comprising bearings fixed to the stage, said bearings movably engage said guiding device.

6. The camera assembly as claimed in claim 5, wherein said bearings are air bearings.

7. The camera assembly as claimed in claim 1, wherein the guiding device comprises a plurality of guide rails which movably engage openings formed in said stage.

8. The camera assembly as claimed in claim 1, wherein the guiding device comprises a pair of spaced, parallel tracks and the stage having a plurality of rollers rotatably mounted on said stage and in rolling engagement with said tracks to suspend said stage from said tracks for rolling movement thereon.

9. The camera assembly as claimed in claim 1, further comprising means for dampening vibration caused by movement of the camera.

10. The camera assembly as claimed in claim 2, wherein the means for dampening vibration comprises a elastomer member positioned between the guiding device and the support frame.

11. The camera assembly as claimed in claim 1, wherein the driving device is a linear servomotor.

12. The camera assembly as claimed in claim 1, wherein the guiding device is a belt and pulley system.

13. The camera as claimed in claim 1, wherein the stage has a U-shaped housing.

14. The camera assembly as claimed in claim 1, where the stage provides the camera with at least one degree of movement.

15. The camera assembly as claimed in claim 1, further comprising means for pivoting the camera along a vertical axis.

16. The camera assembly as claimed in claim 15, wherein the means for pivoting the camera along the vertical axis comprises a pan pivot and a motor connected to said pan pivot.

17. The camera assembly as claimed in claim 16, further comprising a sensor connected to said motor, said sensor senses pan position and pan velocity of the camera and transmits signals pertaining to the pan position and pan velocity to the means for controlling via a communication link.

18. The camera assembly as claimed in claim 1, further comprising a means for pivoting the camera along a horizontal axis.

19. The camera assembly as claimed in claim 18, wherein the means for pivoting the camera along the horizontal axis comprises a tilt pivot and a motor connected to said tilt pivot.

20. The camera assembly as claimed in claim 19, further comprising a sensor connected to said motor, said sensor senses tilt position and tilt velocity of the camera and transmits signals pertaining to the tilt position and tilt velocity to the means for controlling via a communications link.

21. The camera assembly as claimed in claim 1, wherein said guiding device has opposite ends, a sensor is affixed to each of said opposite ends, said sensor transmits signals pertaining to location of said stage to means for controlling.

22. The camera assembly as claimed in claim 1, further comprising a servo loop having a servo amplifier connected to said driving device, a motion controller connected to said servo amplifier, a linear optical encoder attached to the stage and connected to said motion controller, limit and home sensors mounted at the ends of the guiding device and connected to said motion controller, and said means for controlling the camera connected to said motion controller.

23. The camera assembly as claimed in claim 1, wherein said camera comprises an optical assembly mounted on said stage and a camera control unit located remote from said stage, said optical assembly and said camera control unit being electrically connected to each other by a flexible cable.

24. The camera assembly as claimed in claim 23, wherein said optical assembly comprises a charged coupled device and a lens assembly.

25. The camera assembly as claimed in claim 1, further comprising means for displaying video filmed by said camera.

26. A camera assembly for filming hands playing a piano, the camera assembly comprising:
- a guiding device mounted to the piano;
- a stage movably engaged to the guiding device;
- a camera mounted to the stage;
- a driving device connected to the stage for moving the stage along the guiding device;
- a means for controlling the camera to follow the hands;
- a support frame affixed inside the piano, the guiding device being mounted to the support frame; and
- means for dampening vibration caused by movement of the camera.

27. A camera assembly for filming hands playing a piano, the camera assembly comprising:
- a guiding device mounted to the piano;
- a stage movably engaged to the guiding device;
- a camera mounted to the stage;
- a driving device connected to the stage for moving the stage along the guiding device;
- a means for controlling the camera to follow the hands;
- a support frame affixed inside the piano, the guiding device being mounted to the support frame; and
- a means for dampening vibration caused by movement of the camera comprising a elastomer member positioned between the guiding device and the support frame.

* * * * *